US009494222B2

United States Patent
Versteyhe et al.

(10) Patent No.: US 9,494,222 B2
(45) Date of Patent: Nov. 15, 2016

(54) HYDROSTATIC AND DIRECT DRIVE TRANSMISSION

(71) Applicant: DANA ITALIA SPA, Arco (IT)

(72) Inventors: Mark R. J. Versteyhe, Oostkamp (BE); Luca Gilardino, Riv del Garda (IT); (Continued)

(73) Assignee: Dana Italia S.p.A., Arco (TN) (IT)

( * ) Notice: Subject to any disclaimer, the term of this patent is extended or adjusted under 35 U.S.C. 154(b) by 0 days.

(21) Appl. No.: 14/392,063

(22) PCT Filed: Feb. 11, 2014

(86) PCT No.: PCT/EP2014/052640
§ 371 (c)(1),
(2) Date: Jul. 28, 2015

(87) PCT Pub. No.: WO2014/122322
PCT Pub. Date: Aug. 14, 2014

(65) Prior Publication Data
US 2015/0377333 A1    Dec. 31, 2015

Related U.S. Application Data

(60) Provisional application No. 61/762,994, filed on Feb. 11, 2013, provisional application No. 61/811,581, filed on Apr. 12, 2013.

(51) Int. Cl.
*F16H 47/02* (2006.01)
*B60K 17/10* (2006.01)
(Continued)

(52) U.S. Cl.
CPC ............... *F16H 47/02* (2013.01); *B60K 17/10* (2013.01); *B60K 17/28* (2013.01); *B60K 17/356* (2013.01); *F16H 2047/025* (2013.01); *Y02T 10/76* (2013.01)

(58) Field of Classification Search
CPC .................. B60K 17/356; B60K 17/10; B60K 17/28; F16H 47/02; Y02T 10/76
See application file for complete search history.

(56) References Cited

U.S. PATENT DOCUMENTS 3,597,998 A    8/1971  Ebert
4,043,227 A    8/1977  Beals et al.
(Continued)

FOREIGN PATENT DOCUMENTS

DE    19803510 A1    9/1999
EP    0026115 A2    4/1981
(Continued)

OTHER PUBLICATIONS

Gourves et al., Kinematic traction chain for hybrid motor vehicle, has engaging or disengaging units to engage or disengage mechanical connection between engine and wheels, where gear ratios of units are adopted for obtaining optimized output at high speed, Aug. 3, 2012, EPO, FR 2970908 A1, English Abstract.*

(Continued)

*Primary Examiner* — James English
(74) *Attorney, Agent, or Firm* — Marshall & Melborn, LLC

(57) ABSTRACT

A hydrostatic driveline is provided. The hydrostatic driveline comprises a power source, a hydrostatic pump, a hydrostatic motor, a direct drive link, and a transmission portion. The power source is drivingly engaged with an input member. The hydrostatic pump is in driving engagement with the input member. The hydrostatic motor is in fluid communication with the hydrostatic pump. The direct drive link is in driving engagement with the input member. The transmission portion is in driving engagement with a vehicle output and at least one of the hydrostatic motor and the direct drive link The transmission portion includes at least one engagement device and a drive ratio. The hydro- (Continued)

static pump, the hydrostatic motor, and the transmission portion form a first power path for the hydrostatic driveline and the direct drive link forms a second power path for the hydrostatic driveline.

14 Claims, 15 Drawing Sheets

(72) Inventors: Giulio Ornella, Arco (IT); Nicola Tessaro, Arco (IT); Ettore Cosoli, Padua (IT)

(51) Int. Cl.
*B60K 17/356* (2006.01)
*B60K 17/28* (2006.01)

(56) References Cited

U.S. PATENT DOCUMENTS

| | | | |
|---|---|---|---|
| 5,193,416 | A | 3/1993 | Kanayama |
| 5,946,983 | A | 9/1999 | Brambilla |
| 6,044,728 | A | 4/2000 | Pecceu |
| 6,145,409 | A | 11/2000 | Auer |
| 6,361,463 | B1 | 3/2002 | Kojima |
| 7,074,149 | B2 | 7/2006 | Morimoto |
| 7,793,496 | B2 * | 9/2010 | Rampen .......... B60K 6/12 60/414 |
| 8,667,865 | B2 | 3/2014 | Hoyle et al. |
| 8,839,694 | B2 | 9/2014 | Detrick et al. |
| 2010/0307881 | A1 * | 12/2010 | Detrick .......... B60K 6/12 192/3.22 |
| 2011/0030505 | A1 * | 2/2011 | Hoyle .......... B60K 17/35 74/665 A |

FOREIGN PATENT DOCUMENTS

| | | |
|---|---|---|
| EP | 0896893 A2 | 2/1999 |
| EP | 2258576 A1 | 12/2010 |
| EP | 2264334 A1 | 12/2010 |
| EP | 2426376 A2 | 3/2012 |
| FR | 2970908 A1 | 8/2012 |
| JP | 2010076748 A | 4/2010 |

OTHER PUBLICATIONS

Gourves et al., Kinematic traction chain for hybrid motor vehicle, has engaging or disengaging units to engage or disengage mechanical connection between engine and wheels, where gear ratios of units are adopted for obtaining optimized output at high speed, Aug. 3, 2012, EPO, FR 2970908 A1, Machine Translation of Description.*

Marchand et al., Hydrostatic transmissions with a wide working range, Apr. 1, 1984, EPO, EP 0026115 A2, English Abstract.*

Marchand et al., Hydrostatic transmissions with a wide working range, Apr. 1, 1984, EPO, EP 0026115 A2, Machine Translation of Description.*

European Patent Office; International Search Report and Written Opinion of the International Searching Authority; Mar. 17, 2014; International Application No. PCT/EP2014/052640; EPO, Rijswijk, Netherlands.

European Patent Office; International Search Report and Written Opinion of the International Searching Authority; Jun. 17, 2014; International Application No. PCT/EP2014/057451; EPO, Rijswijk, Netherlands.

* cited by examiner

HYDROSTATIC AND DIRECT DRIVE TRANSMISSION

CLAIM OF PRIORITY

The present application claims the benefit of priority to U.S. Provisional Application No. 61/762,994 filed on Feb. 11, 2013 and U.S. Provisional Application No. 61/811,581 filed on Apr. 12, 2013, both of which are incorporated herein in their entirety by reference.

FIELD OF THE INVENTION

The present invention relates to hydrostatic drivelines and more specifically to a hydrostatic drivelines having a direct drive capability.

BACKGROUND OF THE INVENTION

Hydrostatic transmissions use a hydraulic fluid to transmit power from a power source (for example, an internal combustion engine) to a power output (for example, a final drive or a plurality of wheels). Hydrostatic transmissions are typically used in agricultural tractors and other off-highway equipment, for example, forklifts, excavators, earth moving machines, and other vehicles, The major benefits of hydrostatic transmissions are a large range of continuously variable speed, a precise control of traction effort and speed, and high maneuverability. Each of these benefits is directly related to vehicle productivity. Other advantages include high power capability in a compact size, a fast response related to low inertia, maintaining a controlled speed regardless of load, high traction force at a low engine speed, flexibility in packaging, dynamic braking, and simplicity in reversing vehicle direction. Compared to traditional solutions, such as a hydrodynamic transmission with a torque converter, hydrostatic transmissions can provide improved performance. As a non-limiting example, a wheel loader application may require high maneuverability and a wide torque and speed conversion range.

Hydrostatic transmissions are not without their drawbacks, however. Hydrostatic transmissions tend to have a lower overall efficiency, increased maintenance costs, and increased initial investment cost compared to conventional gear transmissions. As a result, design considerations for a given application in a hydrostatic transmission are very important. As a non-limiting example, a hydrostatic transmission design can focus on one or more particular operating modes, such as low speed driving to provide maximum tractive effort, variable speed operation, or maximum speed operation. Focusing a design on an operating mode, will increase an overall efficiency of the transmission and proper sizing of transmission components will result in a more cost-effective solution.

A hydrostatic driveline can be divided into many standard categories based on the characteristics of the hydraulic pump and the hydraulic motor. The hydrostatic driveline can include a fixed displacement pump or a variable displacement pump and a fixed displacement motor or a variable displacement motor. A common combination amongst hydrostatic drivelines is a driveline configures with a variable displacement pump and a fixed displacement motor. In this combination, an output speed is controlled by varying a displacement of the pump.

To increase versatility of a hydrostatic driveline, such as including a high output capacity and a wide velocity of operational ranges, many alternative concepts of hydrostatic drivelines have been developed to meet such demands. One of the simplest and most common solutions is to use the hydrostatic transmission with a mechanical gearbox connected in series, and is shown in FIG. 1. A hydrostatic driveline 1000 includes a power source 1002 in driving engagement with a hydrostatic pump 1004. The hydrostatic pump 1004 is in fluid communication with a to hydrostatic motor 1006. The hydrostatic motor 1006 is in driving engagement with a transmission 1008, which is in driving engagement with a vehicle output 1010. As shown in FIG. 1, the hydrostatic pump 1004 and the hydrostatic motor 1006 may be bypassed through the use of a torque converter 1012.

It would be advantageous to develop a hydrostatic driveline that includes a direct drive capability, which offers the benefits of increased efficiency at a high speed operating mode while maintaining the benefits of a hydrostatic drive at a low speed operating mode.

SUMMARY OF THE INVENTION

Presently provided by the invention, a hydrostatic driveline that includes a direct drive capability, which offers the benefits of increased efficiency at a high speed operating mode while maintaining the benefits of a hydrostatic drive at a low speed operating mode, has surprisingly been discovered.

In one embodiment, the present invention is directed to a hydrostatic driveline. The hydrostatic driveline comprises a power source, a hydrostatic pump, a hydrostatic motor, a direct drive link, and a transmission portion. The power source is drivingly engaged with an input member. The hydrostatic pump is in driving engagement with the input member. The hydrostatic motor is in fluid communication with the hydrostatic pump. The direct drive link is in driving engagement with the input member. The transmission portion is in driving engagement with a vehicle output and at least one of the hydrostatic motor and the direct drive link. The transmission portion includes at least one engagement device and a drive ratio. The hydrostatic pump, the hydrostatic motor, and the transmission portion form a first power path for the hydrostatic driveline and the direct drive link forms a second power path for the hydrostatic driveline.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
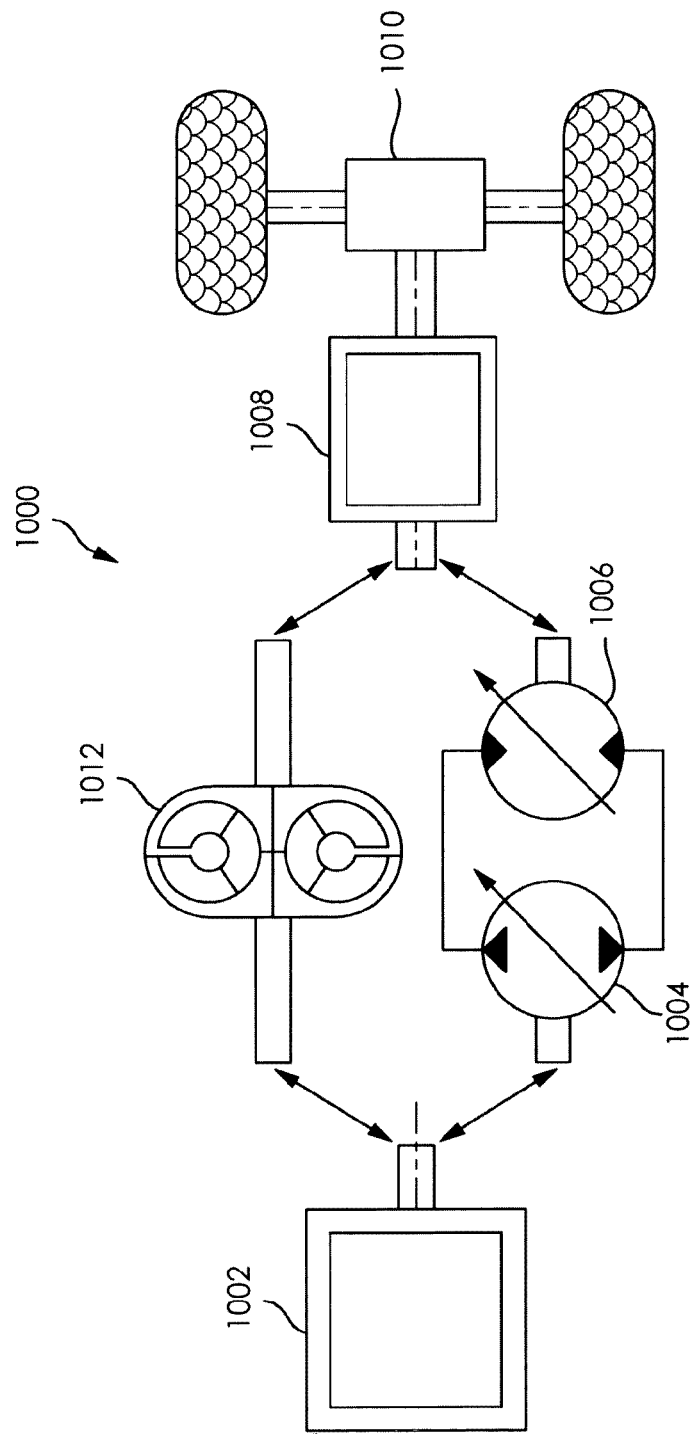
FIG. 1 is a schematic illustration of a hydrostatic driveline known in the prior art.
Figure 2:
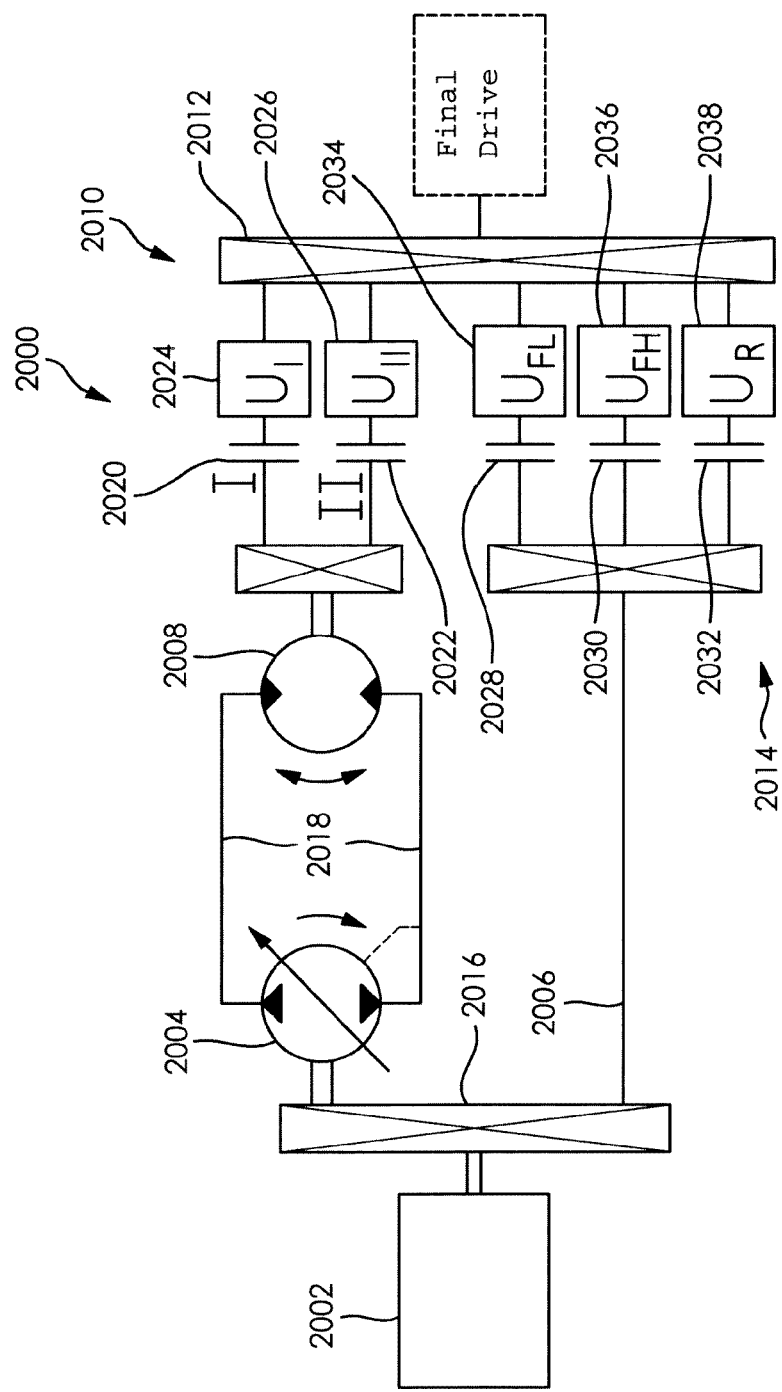
FIG. 2 is a schematic illustration of a hydrostatic driveline according to an embodiment of the present invention.

FIG. 2 illustrates a hydrostatic driveline 2000. The hydrostatic driveline 2000 includes a power source 2002 in driving engagement with a hydrostatic pump 2004 and a direct drive link 2006. The hydrostatic pump 2004 is in fluid communication with a hydrostatic motor 2008. The hydrostatic motor 2008 is in driving engagement with a first transmission portion 2010, which is in driving engagement with a vehicle output 2012. The direct drive link 2006 is in driving engagement with a second transmission portion 2014, which is in driving engagement with the vehicle output 2012. The hydrostatic driveline 2000 may be operated in a hydrostatic mode or a direct drive mode.

The power source 2002 applies power to an input 2016 of the hydrostatic driveline 2000. The power source 2002 is, for example, an internal combustion engine; however, it is understood that the power source 2002 may include an electric motor or another source of rotational output. It is understood that the power source 2002 may be a hybrid power source including both an internal combustion engine and an electric motor. Further, it is understood that the power source 2002 may include an output ratio adjusting device as known in the art. Further, it is understood that the power source 2002 may include an engagement device (not shown) as known in the art, for one of reducing and interrupting a rotational force transferred to the hydrostatic driveline 2000.

The input 2016 is in driving engagement with the power source 2002, the hydrostatic pump 2004, and the direct drive link 2006. The input 2016 may be a gear, a plurality of gears, a shaft, or another type of mechanical connection.

The hydrostatic pump 2004 is a hydraulic axial piston pump having a movable swashplate (not shown) which varies a displacement thereof. However, it is understood the hydrostatic pump 2004 may be any other type of variable displacement pump. As mentioned hereinabove, the hydrostatic pump 2004 is drivingly engaged with the power source 2002 through the input 2016. The hydrostatic pump 2004 is in fluid communication with the hydrostatic motor 2008 through at least two fluid conduits 2018. As the hydrostatic pump 2004 is drivingly engaged with the power source 2002, a drive portion of the hydrostatic pump 2004 always rotates in the same direction as the power source 2002. A direction of flow through the hydrostatic pump 2004 is changed by adjusting a swashplate angle of the hydrostatic pump 2004. By adjusting the swashplate angle of the hydrostatic pump 2004, a forward and a reverse direction is provided when the hydrostatic driveline 2000 is operated in the hydrostatic mode.

The hydrostatic motor 2008 is a fixed displacement hydraulic motor. However, it is understood the hydrostatic motor 2008 may be another type of hydraulic motor. The hydrostatic motor 2008 is drivingly engaged with the first transmission portion 2010. The hydrostatic motor 2008 is in fluid communication with the hydrostatic pump 2004 through the at least two fluid conduits 2018.

The first transmission portion 2010 is a gearbox drivingly engaged with the hydrostatic motor 2008 and the vehicle output 2012. The first transmission portion 2010 includes a first engagement device 2020, a second engagement device 2022, a first drive ratio 2024, and a second drive ratio 2026. By engaging one of the engagement devices 2020, 2022, one of the drive ratios 2024, 2026 is selected. The engagement devices 2020, 2022 are clutches which may be variably engaged; however, it is understood that other types of engagement devices may be used. As mentioned hereinabove, by adjusting the swashplate angle of the hydrostatic pump 2004, the first transmission portion 2010, and thus the vehicle output 2012, may be operated in a forward and a reverse direction.

The direct drive link 2006 is a mechanical connection which facilitates driving engagement between the input 2016 and the second transmission portion 2014.

The second transmission portion 2014 is a gearbox drivingly engaged with the direct drive link 2006 and the vehicle output 2012. The second transmission portion 2014 includes a third engagement device 2028, a fourth engagement device 2030, a fifth engagement device 2032, a third drive ratio 2034, a fourth drive ratio 2036, and a fifth drive ratio 2038. By engaging one of the engagement devices 2028, 2030, 2032, one of the drive ratios 2034, 2036, 2038 is selected. The engagement devices 2028, 2030, 2032 are clutches which may be variably engaged; however, it is understood that other types of engagement devices may be used. The drive ratios 2034, 3036, 2038 of the second transmission portion 2014 are configured as two forward drive speeds and one reverse drive speed; however, it is understood that the second transmission portion 2014 may have other drive speed arrangements.

In use, the hydrostatic driveline 2000 may be operated in the hydrostatic mode or the direct drive mode. In either of the drive modes, only one of the engagement devices 2020, 2022, 2028, 2030, 2032 may be fully engaged at any given instant. In the hydrostatic mode, the hydrostatic driveline 2000 is operated at lower speeds using one of the first drive ratio 2024 and the second drive ratio 2026. As mentioned hereinabove, by adjusting the swashplate angle of the hydrostatic pump 2004, the forward and the reverse direction is provided to each of the drive ratios 2024, 2026. In the direct drive mode, the hydrostatic driveline 2000 is operated at higher speeds using one of the third drive ratio 2034, the fourth drive ratio 2036, and the fifth drive ratio 2038. As mentioned hereinabove, the drive ratios 2034, 3036, 2038 of the second transmission portion 2014 are configured as two forward drive speeds and one reverse drive speed.

Figure 3:
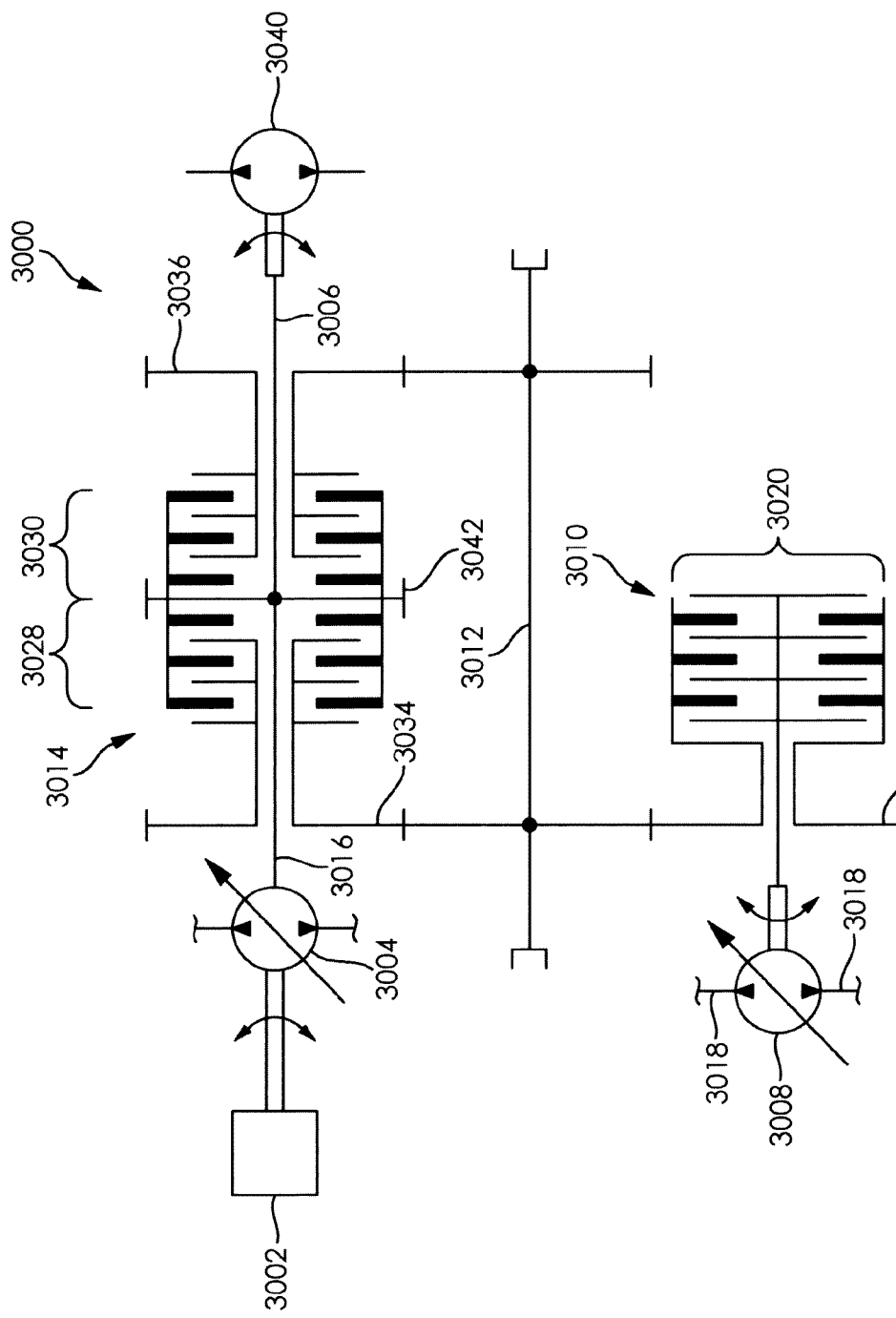
FIG. 3 is a schematic illustration of a variation of the hydrostatic driveline shown in FIG. 2.

FIG. 3 illustrates a hydrostatic driveline 3000. The hydrostatic driveline 3000 is a variation of the hydrostatic driveline 2000, and has similar features thereto. It is also understood that the hydrostatic driveline 3000 may not illustrate all of the features of the hydrostatic driveline 2000. The hydrostatic driveline 3000, however, is a specific embodiment of a hydrostatic driveline that provides a greater level of detail regarding component orientation and component configuration than the hydrostatic driveline 2000. The variation of the invention shown in FIG. 3 includes similar components to the hydrostatic driveline 2000 illustrated in FIG. 2. Similar features of the variation shown in FIG. 3 are numbered similarly in series. Different and additional features of the variation shown in FIG. 3 can be appreciated by one skilled in the art in view of FIG. 3 and the hydrostatic driveline 2000 illustrated in FIG. 2. Further, it is understood that a reverse drive option may be added to a direct drive mode of the hydrostatic driveline 3000 through the addition of further components to the hydrostatic driveline 3000.

FIG. 3 illustrates the hydrostatic driveline 3000. The hydrostatic driveline 3000 includes a power source 3002 in driving engagement with a hydrostatic pump 3004 and a direct drive link 3006. The hydrostatic pump 3004 is in fluid communication with a hydrostatic motor 3008. The hydrostatic motor 3008 is in driving engagement with a first transmission portion 3010, which is in driving engagement with a vehicle output 3012. The direct drive link 3006 is in driving engagement with a second transmission portion 3014, which is in driving engagement with the vehicle output 3012. The hydrostatic driveline 3000 may be operated in a hydrostatic mode or the direct drive mode.

The hydrostatic driveline 3000 further comprises an auxiliary pump 3040. The auxiliary pump 3040 is in driving engagement with the direct drive link 3006. The auxiliary pump 3040 is a fixed displacement hydraulic pump. However, it is understood the auxiliary pump 3040 may be another type of hydraulic pump. The auxiliary pump 3040 may be in fluid communication with the hydrostatic motor 3008 or an auxiliary device (not shown).

The second transmission portion 3014 further comprises a power take off 3042. The power take off 3042 is a geared portion of the second transmission portion 3014 which may be drivingly engaged with an auxiliary device (not shown).

Figure 4:
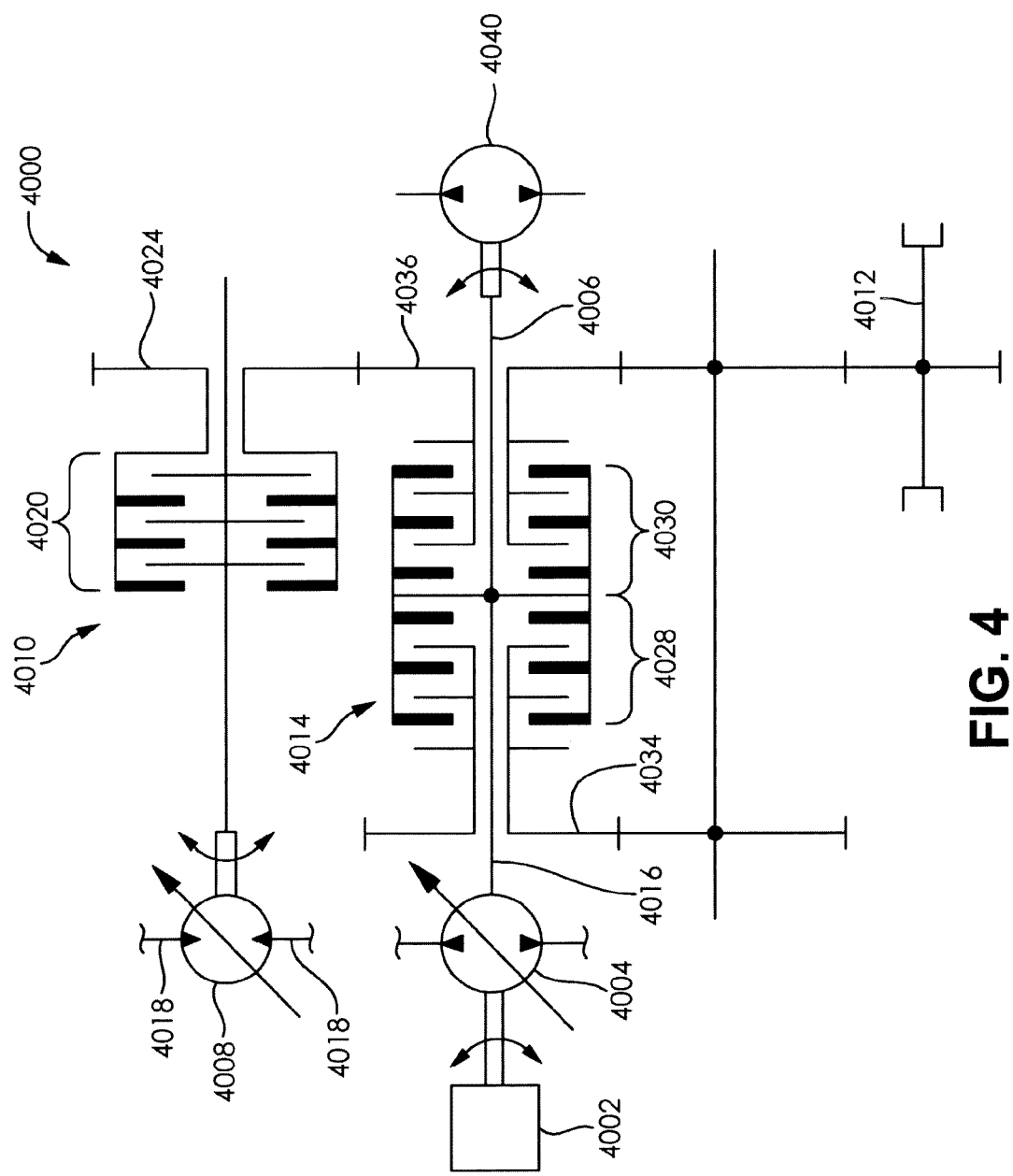
FIG. 4 is a schematic illustration of a variation of the hydrostatic driveline shown in FIG. 2.

FIG. 4 illustrates a hydrostatic driveline 4000. The hydrostatic driveline 4000 is a variation of the hydrostatic driveline 2000, and has similar features thereto. It is also understood that the hydrostatic driveline 4000 may not illustrate all of the features of the hydrostatic driveline 2000. The hydrostatic driveline 4000, however, is a specific embodiment of a hydrostatic driveline that provides a greater level of detail regarding component orientation and component configuration than the hydrostatic driveline 2000. The variation of the invention shown in FIG. 4 includes similar components to the hydrostatic driveline 2000 illustrated in FIG. 2. Similar features of the variation shown in FIG. 4 are numbered similarly in series. Different and additional features of the variation shown in FIG. 4 can be appreciated by one skilled in the art in view of FIG. 4 and the hydrostatic driveline 2000 illustrated in FIG. 2. Further, it is understood that a reverse drive option may be added to a direct drive mode of the hydrostatic driveline 4000 through the addition of further components to the hydrostatic driveline 4000.

FIG. 4 illustrates the hydrostatic driveline 4000. The hydrostatic driveline 4000 includes a power source 4002 in driving engagement with a hydrostatic pump 4004 and a direct drive link 4006. The hydrostatic pump 4004 is in fluid communication with a hydrostatic motor 4008. The hydrostatic motor 4008 is in driving engagement with a first transmission portion 4010, which is in driving engagement with a vehicle output 4012, through a portion of a second transmission portion 4014. The direct drive link 4006 is in driving engagement with the second transmission portion 4014, which is in driving engagement with the vehicle output 4012. The hydrostatic driveline 4000 may be operated in a hydrostatic mode or the direct drive mode.

The hydrostatic driveline 4000 further comprises an auxiliary pump 4040.

The auxiliary pump 4040 is in driving engagement with the direct drive link 4006. The auxiliary pump 4040 is a fixed displacement hydraulic pump. However, it is understood the auxiliary pump 4040 may be another type of hydraulic pump. The auxiliary pump 4040 may be in fluid communication with the hydrostatic motor 4008 or an auxiliary device (not shown).

Figure 5:
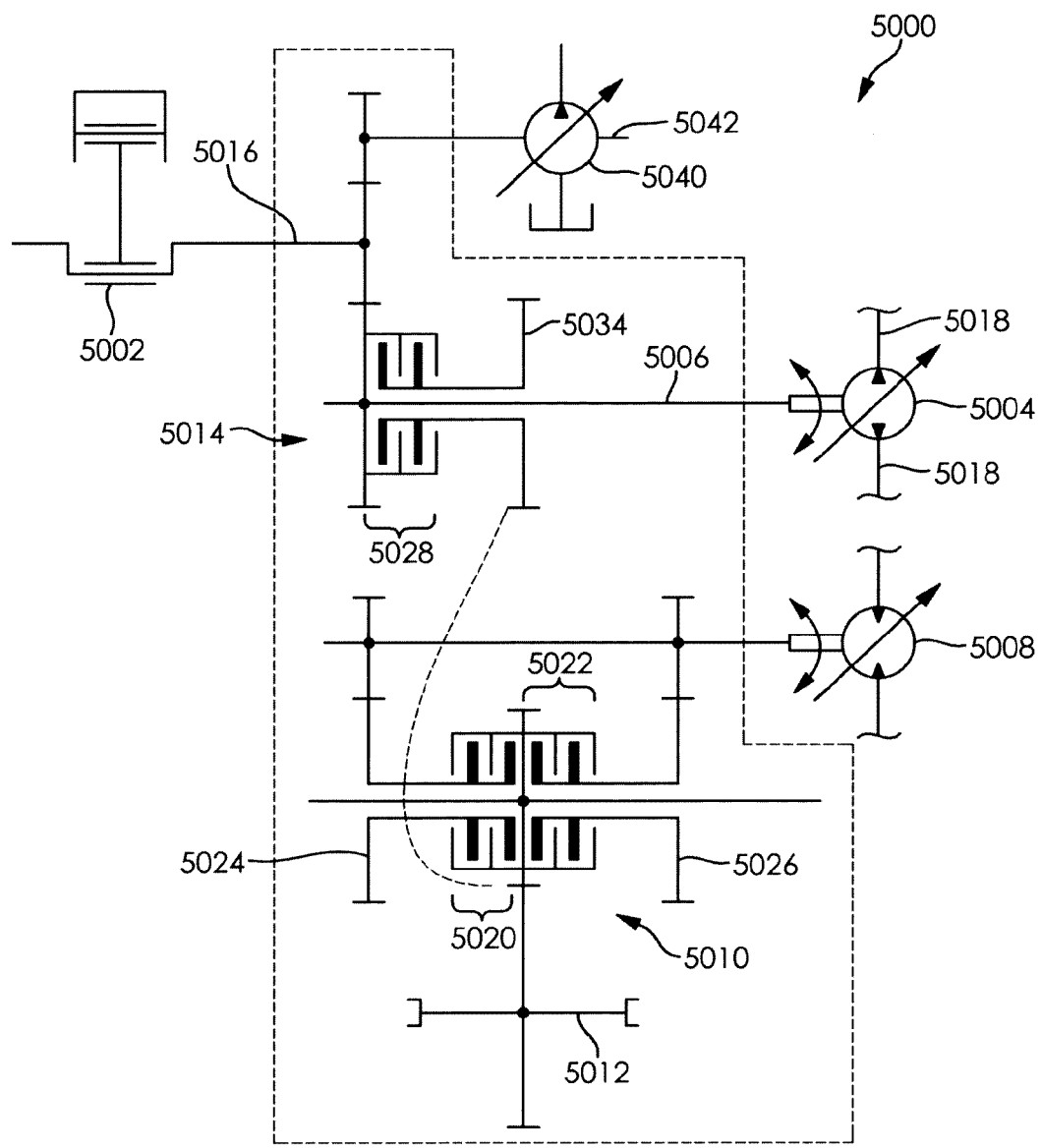
FIG. 5 is a schematic illustration of a variation of the hydrostatic driveline shown in FIG. 2.

FIG. 5 illustrates a hydrostatic driveline 5000. The hydrostatic driveline 5000 is a variation of the hydrostatic driveline 2000, and has similar features thereto. It is also understood that the hydrostatic driveline 5000 may not illustrate all of the features of the hydrostatic driveline 2000. The hydrostatic driveline 5000, however, is a specific embodiment of a hydrostatic driveline that provides a greater level of detail regarding component orientation and component configuration than the hydrostatic driveline 2000. The variation of the invention shown in FIG. 5 includes similar components to the hydrostatic driveline 2000 illustrated in FIG. 2. Similar features of the variation shown in FIG. 5 are numbered similarly in series. Different and additional features of the variation shown in FIG. 5 can be appreciated by one skilled in the art in view of FIG. 5 and the hydrostatic driveline 2000 illustrated in FIG. 2. Further, it is understood that a reverse drive option may be added to a direct drive mode of the hydrostatic driveline 5000 through the addition of further components to the hydrostatic driveline 5000.

FIG. 5 illustrates the hydrostatic driveline 5000. The hydrostatic driveline 5000 includes a power source 5002 in driving engagement with a hydrostatic pump 5004 and a direct drive link 5006. The hydrostatic pump 5004 is in fluid communication with a hydrostatic motor 5008. The hydrostatic motor 5008 is in driving engagement with a first transmission portion 5010, which is in driving engagement with a vehicle output 5012. The direct drive link 5006 is in driving engagement with a second transmission portion 5014, which is in driving engagement with the vehicle output 5012 through a portion of a first transmission portion 5010. The hydrostatic driveline 5000 may be operated in a hydrostatic mode or the direct drive mode.

The hydrostatic driveline 5000 further comprises an auxiliary pump 5040. The auxiliary pump 5040 is in driving engagement with the direct drive link 5006.

The auxiliary pump 5040 is a fixed displacement hydraulic pump. However, it is understood the auxiliary pump 5040 may be another type of hydraulic pump. The auxiliary pump 5040 may be in fluid communication with the hydrostatic motor 5008 or an auxiliary device (not shown).

The hydrostatic driveline 5000 further comprises a power take off 5042. The power take off 5042 is in driving engagement with the direct drive link 5006 through the auxiliary pump 5040. The power take off 5042 may be drivingly engaged with an auxiliary device (not shown).

Figure 6:
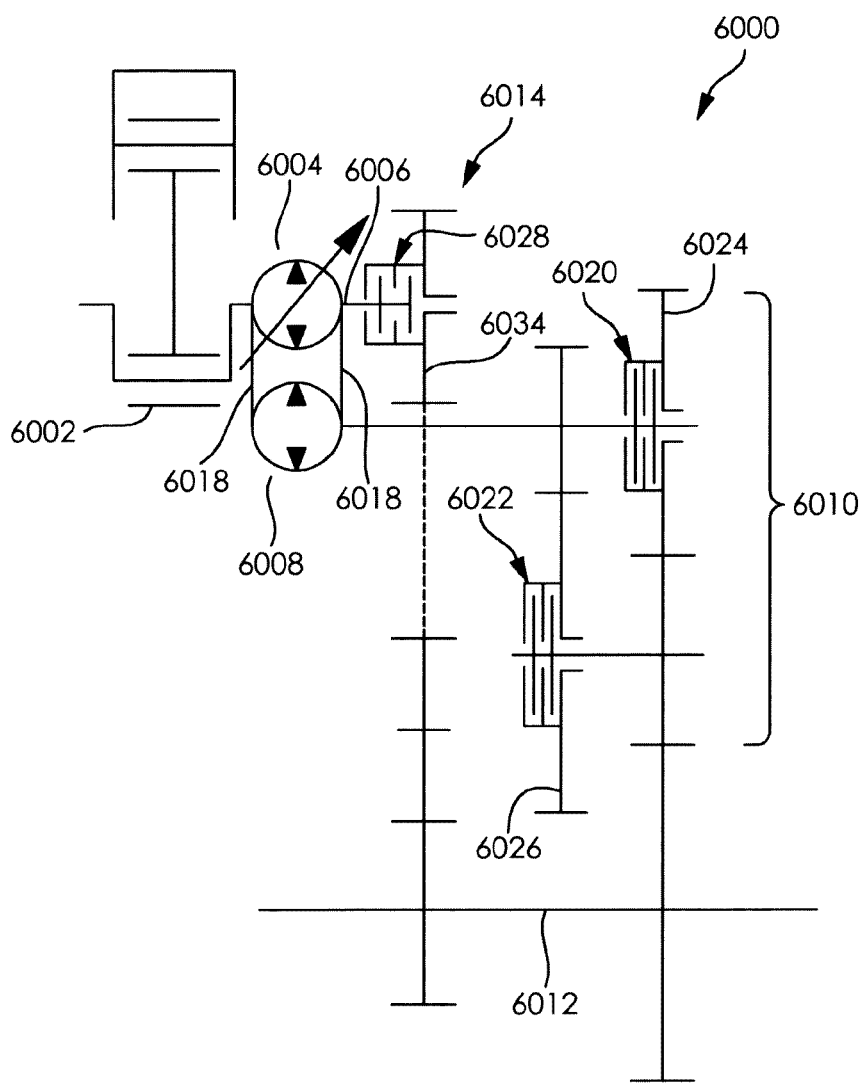
FIG. 6 is a schematic illustration of a variation of the hydrostatic driveline shown in FIG. 2.

FIG. 6 illustrates a hydrostatic driveline 6000. The hydrostatic driveline 6000 is a variation of the hydrostatic driveline 2000, and has similar features thereto. It is also understood that the hydrostatic driveline 6000 may not illustrate all of the features of the hydrostatic driveline 2000. The hydrostatic driveline 6000, however, is a specific embodiment of a hydrostatic driveline that provides a greater level of detail regarding component orientation and component configuration than the hydrostatic driveline 2000. The variation of the invention shown in FIG. 6 includes similar components to the hydrostatic driveline 2000 illustrated in FIG. 2. Similar features of the variation shown in FIG. 6 are numbered similarly in series. Different and additional features of the variation shown in FIG. 6 can be appreciated by one skilled in the art in view of FIG. 6 and the hydrostatic driveline 2000 illustrated in FIG. 2. Further, it is understood that a reverse drive option may be added to a direct drive mode of the hydrostatic driveline 6000 through the addition of further components to the hydrostatic driveline 6000.

FIG. 6 illustrates the hydrostatic driveline 6000. The hydrostatic driveline 6000 includes a power source 6002 in driving engagement with a hydrostatic pump 6004 and a direct drive link 6006. The hydrostatic pump 6004 is in fluid communication with a hydrostatic motor 6008. The hydrostatic motor 6008 is in driving engagement with a first transmission portion 6010, which is in driving engagement with a vehicle output 6012. The direct drive link 6006 is in driving engagement with the second transmission portion 6014, which is in driving engagement with the vehicle output 6012. The hydrostatic driveline 6000 may be operated in a hydrostatic mode or the direct drive mode.

Figure 7:
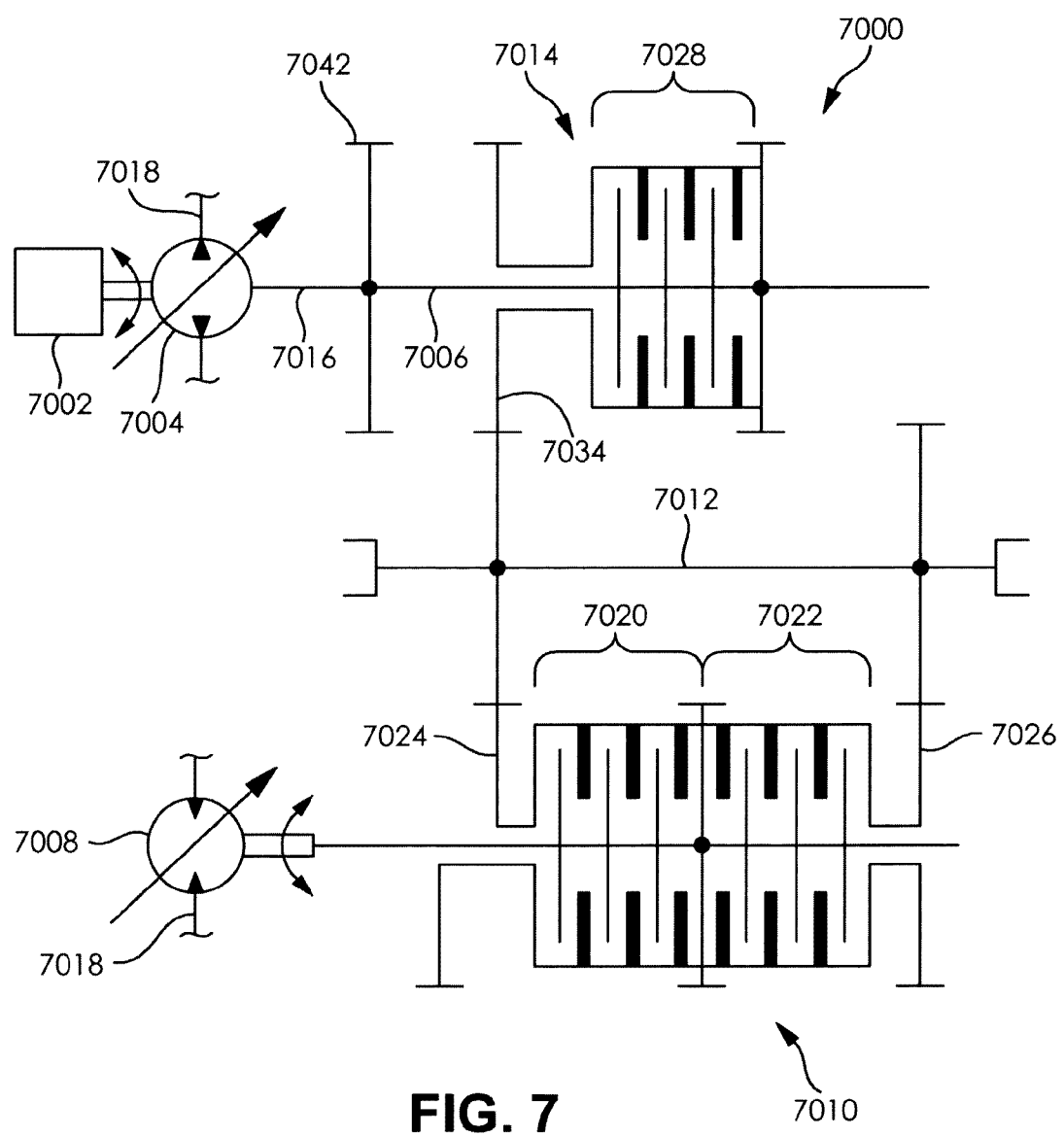
FIG. 7 is a schematic illustration of a variation of the hydrostatic driveline shown in FIG. 2.

FIG. 7 illustrates a hydrostatic driveline 7000. The hydrostatic driveline 7000 is a variation of the hydrostatic driveline 2000, and has similar features thereto. It is also understood that the hydrostatic driveline 7000 may not illustrate all of the features of the hydrostatic driveline 2000. The hydrostatic driveline 7000, however, is a specific embodiment of a hydrostatic driveline that provides a greater level of detail regarding component orientation and component configuration than the hydrostatic driveline 2000. The variation of the invention shown in FIG. 7 includes similar components to the hydrostatic driveline 2000 illustrated in FIG. 2. Similar features of the variation shown in FIG. 7 are numbered similarly in series. Different and additional features of the variation shown in FIG. 7 can be appreciated by one skilled in the art in view of FIG. 7 and the hydrostatic driveline 2000 illustrated in FIG. 2. Further, it is understood that a reverse drive option may be added to a direct drive mode of the hydrostatic driveline 7000 through the addition of further components to the hydrostatic driveline 7000.

FIG. 7 illustrates the hydrostatic driveline 7000. The hydrostatic driveline 7000 includes a power source 7002 in driving engagement with a hydrostatic pump 7004 and a direct drive link 7006. The hydrostatic pump 7004 is in fluid communication with a hydrostatic motor 7008. The hydrostatic motor 7008 is in driving engagement with a first transmission portion 7010, which is in driving engagement with a vehicle output 7012. The direct drive link 7006 is in driving engagement with the second transmission portion 7014, which is in driving engagement with the vehicle output 7012. The hydrostatic driveline 7000 may be operated in a hydrostatic mode or the direct drive mode.

The hydrostatic driveline 7000 further comprises a power take off 7042. The power take off 7042 is in driving engagement with the direct drive link 7006. The power take off 7042 may be drivingly engaged with an auxiliary device (not shown).

Figure 8:
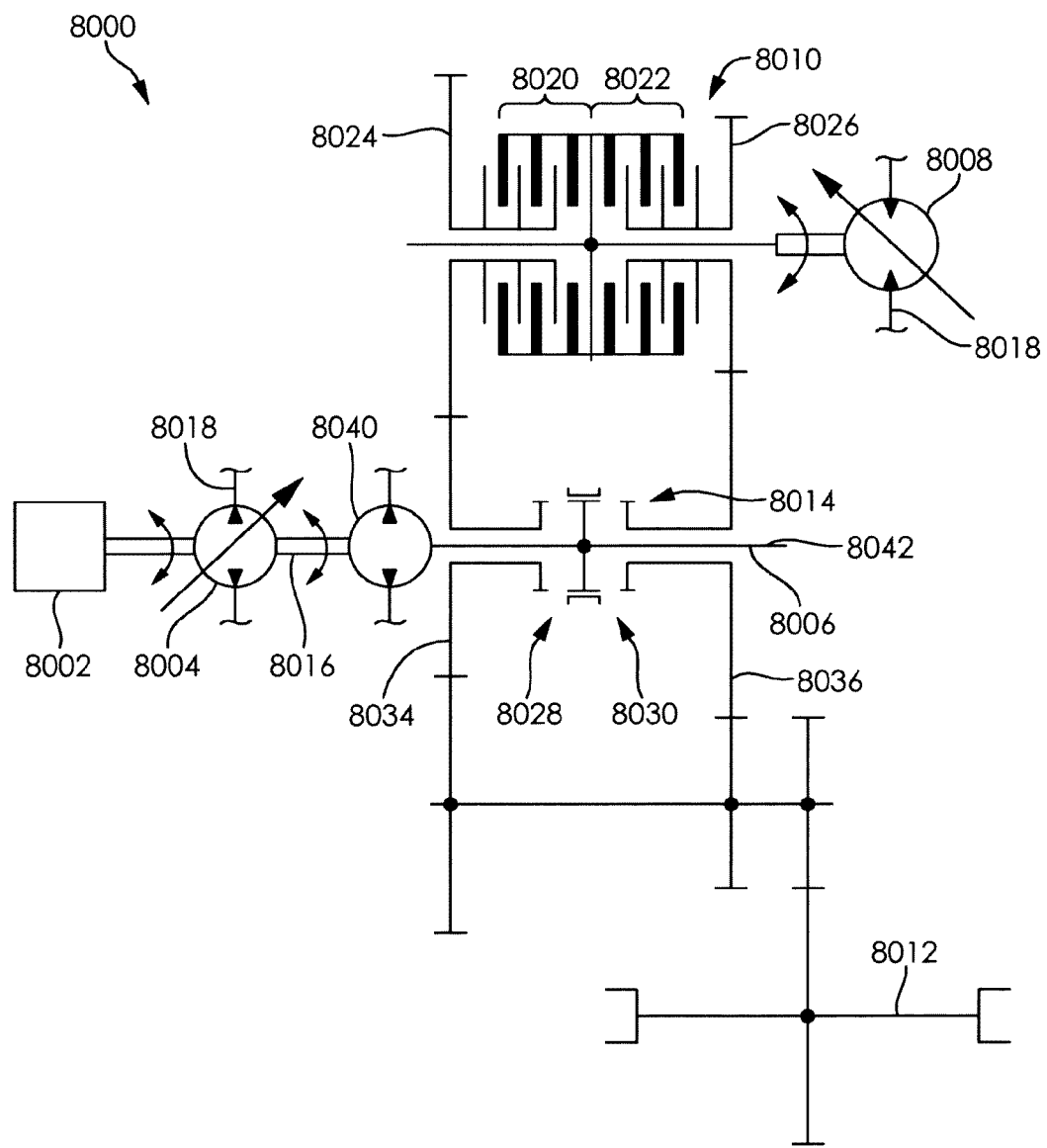
FIG. 8 is a schematic illustration of a variation of the hydrostatic driveline shown in FIG. 2.

FIG. 8 illustrates a hydrostatic driveline 8000. The hydrostatic driveline 8000 is a variation of the hydrostatic driveline 2000, and has similar features thereto. It is also understood that the hydrostatic driveline 8000 may not illustrate all of the features of the hydrostatic driveline 2000. The hydrostatic driveline 8000, however, is a specific embodiment of a hydrostatic driveline that provides a greater level of detail regarding component orientation and component configuration than the hydrostatic driveline 2000. The variation of the invention shown in FIG. 8 includes similar components to the hydrostatic driveline 2000 illustrated in FIG. 2. Similar features of the variation shown in FIG. 8 are numbered similarly in series. Different and additional features of the variation shown in FIG. 8 can be appreciated by one skilled in the art in view of FIG. 8 and the hydrostatic driveline 2000 illustrated in FIG. 2. Further, it is understood that a reverse drive option may be added to a direct drive mode of the hydrostatic driveline 8000 through the addition of further components to the hydrostatic driveline 8000.

FIG. 8 illustrates the hydrostatic driveline 8000. The hydrostatic driveline 8000 includes a power source 8002 in driving engagement with a hydrostatic pump 8004 and a direct drive link 8006. The hydrostatic pump 8004 is in fluid communication with a hydrostatic motor 8008. The hydrostatic motor 8008 is in driving engagement with a first transmission portion 8010, which is in driving engagement with a vehicle output 5012 through a second transmission portion 8014. The direct drive link 8006 is in driving engagement with the second transmission portion 8014, which is in driving engagement with the vehicle output 8012. The hydrostatic driveline 8000 may be operated in a hydrostatic mode or the direct drive mode.

The hydrostatic driveline 8000 further comprises an auxiliary pump 8040. The auxiliary pump 8040 is in driving engagement with the direct drive link 8006. The auxiliary pump 8040 is a fixed displacement hydraulic pump. However, it is understood the auxiliary pump 8040 may be another type of hydraulic pump. The auxiliary pump 8040 may be in fluid communication with the hydrostatic motor 8008 or an auxiliary device (not shown).

The hydrostatic driveline 8000 further comprises a power take off 8042. The power take off 8042 is in driving engagement with the direct drive link 8006 through the auxiliary pump 8040. The power take off 8042 may be drivingly engaged with an auxiliary device (not shown).

Figure 9:
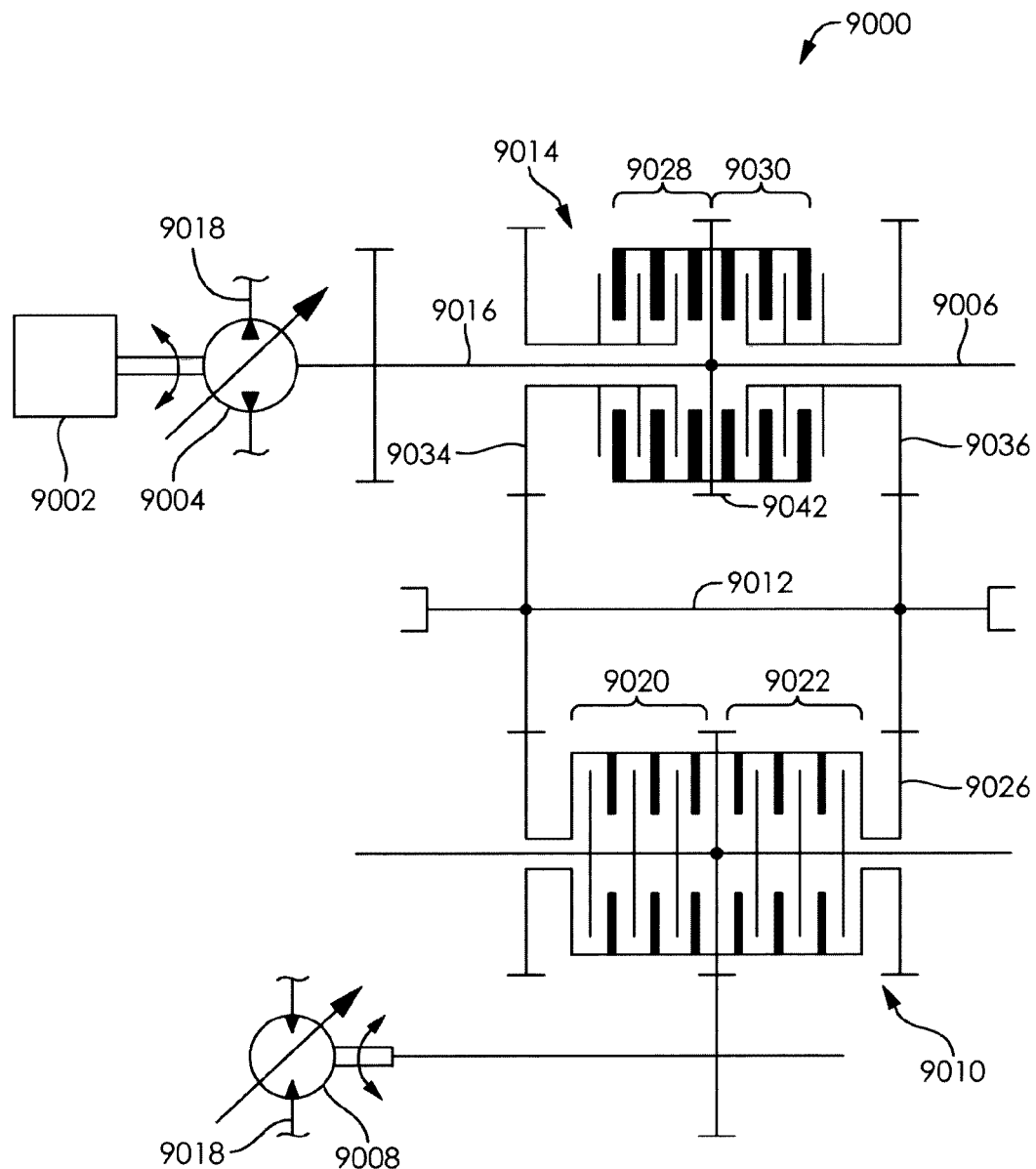
FIG. 9 is a schematic illustration of a variation of the hydrostatic driveline shown in FIG. 2.

FIG. 9 illustrates a hydrostatic driveline 9000. The hydrostatic driveline 9000 is a variation of the hydrostatic driveline 2000, and has similar features thereto. It is also understood that the hydrostatic driveline 9000 may not illustrate all of the features of the hydrostatic driveline 2000. The hydrostatic driveline 9000, however, is a specific embodiment of a hydrostatic driveline that provides a greater level of detail regarding component orientation and component configuration than the hydrostatic driveline 2000. The variation of the invention shown in FIG. 9 includes similar components to the hydrostatic driveline 2000 illustrated in FIG. 2. Similar features of the variation shown in FIG. 9 are numbered similarly in series. Different and additional features of the variation shown in FIG. 9 can be appreciated by one skilled in the art in view of FIG. 9 and the hydrostatic driveline 2000 illustrated in FIG. 2. Further, it is understood that a reverse drive option may be added to a direct drive mode of the hydrostatic driveline 9000 through the addition of further components to the hydrostatic driveline 9000.

FIG. 9 illustrates the hydrostatic driveline 9000. The hydrostatic driveline 9000 includes a power source 9002 in driving engagement with a hydrostatic pump 9004 and a direct drive link 9006. The hydrostatic pump 9004 is in fluid communication with a hydrostatic motor 9008. The hydrostatic motor 9008 is in driving engagement with a first transmission portion 9010, which is in driving engagement with a vehicle output 9012. The direct drive link 9006 is in driving engagement with a second transmission portion 9014, which is in driving engagement with the vehicle output 9012. The hydrostatic driveline 9000 may be operated in a hydrostatic mode or the direct drive mode.

The hydrostatic driveline 9000 further comprises a power take off 9042. The power take off 9042 is in driving engagement with the direct drive link 9006. The power take off 9042 may be drivingly engaged with an auxiliary device (not shown).

Figure 10:
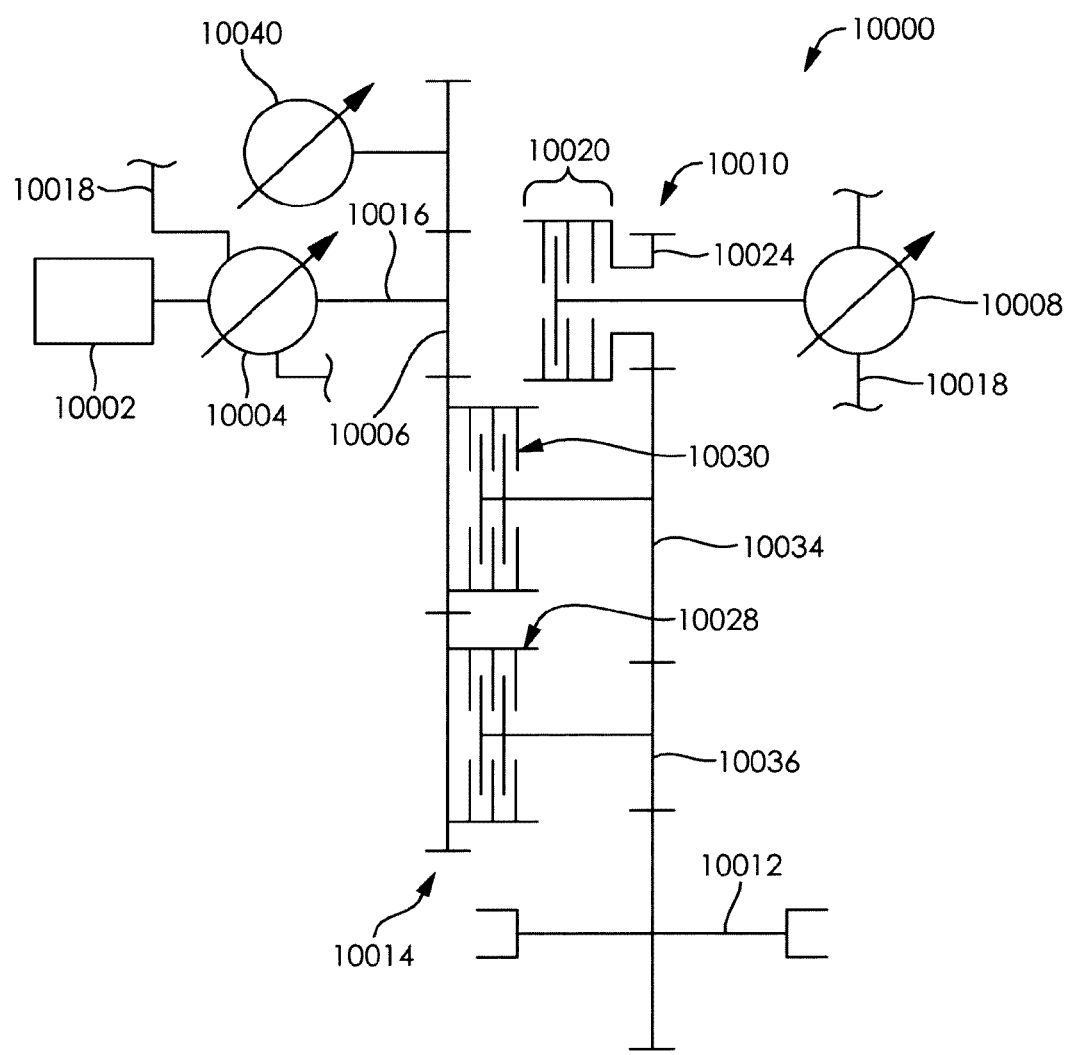
FIG. 10 is a schematic illustration of a variation of the hydrostatic driveline shown in FIG. 2.

FIG. 10 illustrates a hydrostatic driveline 10000. The hydrostatic driveline 10000 is a variation of the hydrostatic driveline 2000, and has similar features thereto. It is also understood that the hydrostatic driveline 10000 may not illustrate all of the features of the hydrostatic driveline 2000. The hydrostatic driveline 10000, however, is a specific embodiment of a hydrostatic driveline that provides a greater level of detail regarding component orientation and component configuration than the hydrostatic driveline 10000. The variation of the invention shown in FIG. 10 includes similar components to the hydrostatic driveline 2000 illustrated in FIG. 2. Similar features of the variation shown in FIG. 10 are numbered similarly in series. Different and additional features of the variation shown in FIG. 10 can be appreciated by one skilled in the art in view of FIG. 10 and the hydrostatic driveline 2000 illustrated in FIG. 2. Further, it is understood that a reverse drive option may be added to a direct drive mode of the hydrostatic driveline 10000 through the addition of further components to the hydrostatic driveline 10000.

FIG. 10 illustrates the hydrostatic driveline 10000. The hydrostatic driveline 10000 includes a power source 10002 in driving engagement with a hydrostatic pump 10004 and a direct drive link 10006. The hydrostatic pump 10004 is in fluid communication with a hydrostatic motor 10008. The hydrostatic motor 10008 is in driving engagement with a first transmission portion 10010, which is in driving engagement with a vehicle output 10012, through a portion of a second transmission portion 10014. The direct drive link 10006 is in driving engagement with the second transmission portion 10014, which is in driving engagement with the vehicle output 10012. The hydrostatic driveline 10000 may be operated in a hydrostatic mode or the direct drive mode.

The hydrostatic driveline 10000 further comprises an auxiliary pump 10040. The auxiliary pump 10040 is in driving engagement with the direct drive link 10006.

The auxiliary pump 10040 is a variable displacement hydraulic pump. However, it is understood the auxiliary pump 10040 may be another type of hydraulic pump. The auxiliary pump 10040 may be in fluid communication with the hydrostatic motor 10008 or an auxiliary device (not shown).

Figure 11:
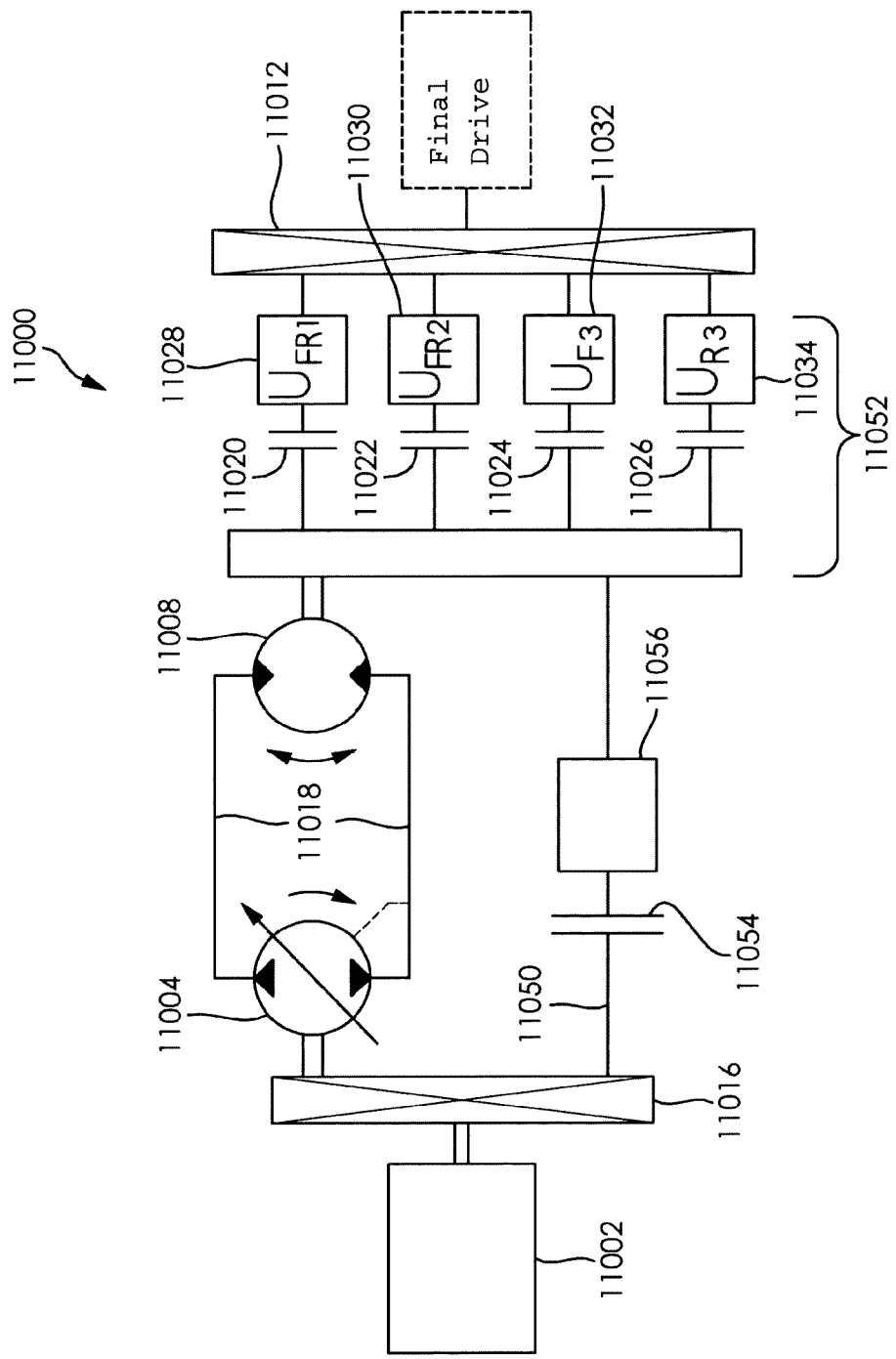
FIG. 11 is a schematic illustration of a hydrostatic driveline according to another embodiment of the present invention.

FIG. 11 illustrates a hydrostatic driveline 11000 according to another embodiment of the invention. The hydrostatic driveline 11000 includes a power source 11002 in driving engagement with a hydrostatic pump 11004 and a direct drive link 11050. The hydrostatic pump 11004 is in fluid communication with a hydrostatic motor 11008. The hydrostatic motor 11008 is in driving engagement with a transmission portion 11052, which is in driving engagement with a vehicle output 11012. The direct drive link 11050 is in driving engagement with the transmission portion 11052, which is in driving engagement with the vehicle output 11012. The hydrostatic driveline 11000 may be operated in a hydrostatic mode or a direct drive mode.

The power source 11002 applies power to an input 11016 of the hydrostatic driveline 11000. The power source 11002 is, for example, an internal combustion engine; however, it is understood that the power source 11002 may include an electric motor or another source of rotational output. It is understood that the power source 11002 may be a hybrid power source including both an internal combustion engine and an electric motor. Further, it is understood that the power source 11002 may include an output ratio adjusting device as known in the art. Further, it is understood that the power source 11002 may include an engagement device (not shown) as known in the art, for one of reducing and interrupting a rotational force transferred to the hydrostatic driveline 2000.

The input 11016 is in driving engagement with the power source 11002, the hydrostatic pump 11004, and the direct drive link 11050. The input 11016 may be a gear, a plurality of gears, a shaft, or another type of mechanical connection.

The hydrostatic pump 11004 is a hydraulic axial piston pump having a movable swashplate (not shown) which varies a displacement thereof. However, it is understood the hydrostatic pump 11004 may be any other type of variable displacement pump. As mentioned hereinabove, the hydrostatic pump 11004 is drivingly engaged with the power source 11002 through the input 11016. The hydrostatic pump 11004 is in fluid communication with the hydrostatic motor 11008 through at least two fluid conduits 11018. As the hydrostatic pump 11004 is drivingly engaged with the power source 11002, a drive portion of the hydrostatic pump 11004 always rotates in the same direction as the power source 11002. A direction of flow through the hydrostatic pump 11004 is changed by adjusting a swashplate angle of the hydrostatic pump 11004. By adjusting the swashplate angle of the hydrostatic pump 11004, a forward and a reverse direction is provided when the hydrostatic driveline 11000 is operated in the hydrostatic mode.

The hydrostatic motor 11008 is a fixed displacement hydraulic motor. However, it is understood the hydrostatic motor 11008 may be another type of hydraulic motor. The hydrostatic motor 11008 is drivingly engaged with the transmission portion 11052. The hydrostatic motor 11008 is in fluid communication with the hydrostatic pump 11004 through the at least two fluid conduits 11018.

The transmission portion 11052 is a gearbox drivingly engaged with the hydrostatic motor 11008, the direct drive link 11050, and the vehicle output 11012. The transmission portion 11052 includes a first engagement device 11020, a second engagement device 11022, a third engagement device 11024, a fourth engagement device 11026, a first drive ratio 11028, a second drive ratio 11030, a third drive ratio 11032, and a fourth drive ratio 11034. The engagement devices 11020, 11022, 11024, 11026 are clutches which may be variably engaged; however, it is understood that other types of engagement devices may be used. By engaging one of the engagement devices 11020, 11022, 11024, 11026, one of the drive ratios 11028, 11030, 11032, 11034 is selected. As mentioned hereinabove, by adjusting the swashplate angle of the hydrostatic pump 11004, a portion of the transmission portion 11052, and thus the vehicle output 11012, may be operated in a forward and a reverse direction. The drive ratios 11028, 11030, 11032, 11034 of the transmission portion 11052 are configured as two forward or reverse drive speeds, one forward drive speed, and one reverse drive speed; however, it is understood that the transmission portion 11052 may have other drive speed arrangements. Further, it is understood that the drive ratios 11028, 11030 may be configured for use only in the hydrostatic mode and that the drive ratios 11032, 11034 may be also configured for use only in the direct drive mode.

The direct drive link 11050 is a mechanical connection which facilitates driving engagement between the input 11016 and the transmission portion 11052. The direct drive link 11050 includes a direct drive engagement device 11054 and a direct drive ratio adjuster 11056. By engaging the direct drive engagement device 11054, the input 11016 is directly drivingly engaged with the transmission portion 11052, and a drive ratio therebetween is adjusted through the direct drive ratio adjuster 11056. The direct drive engagement device 11054 is engaged when the hydrostatic driveline 11000 is operated in the direct drive mode.

In use, the hydrostatic driveline 11000 may be operated in the hydrostatic mode or the direct drive mode. In either of the drive modes, only one of the engagement devices 11020, 11022, 11024, 11026 may be fully engaged at any given instant. In the hydrostatic mode, the hydrostatic driveline 11000 is operated at lower speeds using one of the first drive ratio 11028 and the second drive ratio 11030. As mentioned hereinabove, by adjusting the swashplate angle of the hydrostatic pump 11004, the forward and the reverse direction is provided to each of the drive ratios 11028, 11030. In the direct drive mode, the hydrostatic driveline 11000 is operated at higher speeds using the direct drive ratio adjuster 11056 and one of the second drive ratio 11030, the third drive ratio 11032, and the fourth drive ratio 11034. Accordingly, the second engagement device 11022 and the second drive ratio 11030 may be used in either of the drive modes. As mentioned hereinabove, the drive ratios 11028, 11030, 11032, 11034 of the transmission portion 11052 are configured as two forward or reverse drive speeds, one forward drive speed, and one reverse drive speed.

Figure 12:
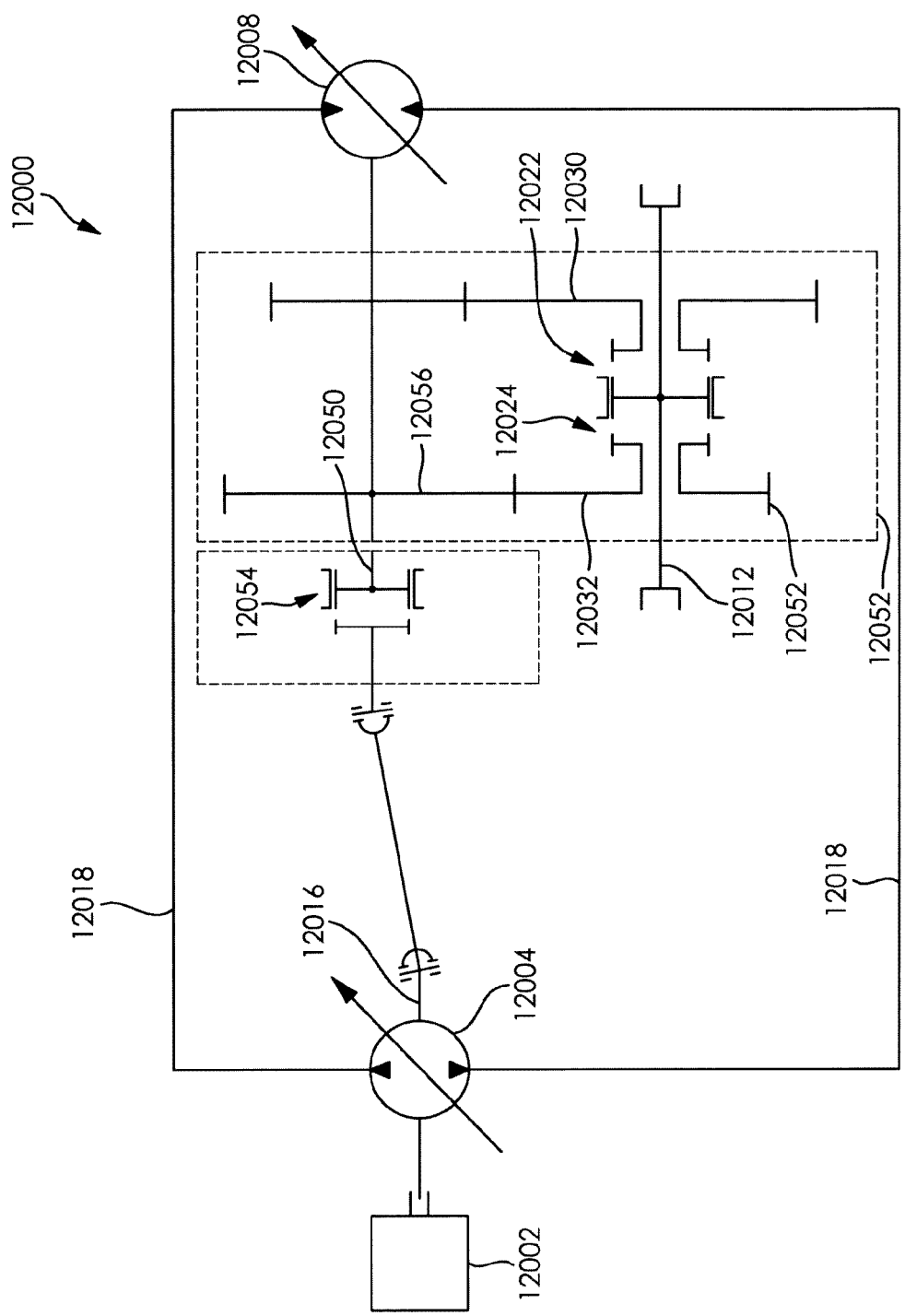
FIG. 12 is a schematic illustration of a variation of the hydrostatic driveline shown in FIG. 11.

FIG. 12 illustrates a hydrostatic driveline 12000. The hydrostatic driveline 12000 is a variation of the hydrostatic driveline 11000, and has similar features thereto. It is also understood that the hydrostatic driveline 12000 may not illustrate all of the features of the hydrostatic driveline 11000. The hydrostatic driveline 12000, however, is a specific embodiment of a hydrostatic driveline that provides a greater level of detail regarding component orientation and component configuration than the hydrostatic driveline 11000. The variation of the invention shown in FIG. 12 includes similar components to the hydrostatic driveline 11000 illustrated in FIG. 11. Similar features of the variation shown in FIG. 12 are numbered similarly in series. Different and additional features of the variation shown in FIG. 12 can be appreciated by one skilled in the art in view of FIG. 12 and the hydrostatic driveline 11000 illustrated in FIG. 11. Further, it is understood that a reverse drive option may be added to a direct drive mode of the hydrostatic driveline 12000 through the addition of further components to the hydrostatic driveline 12000.

FIG. 12 illustrates a hydrostatic driveline 12000. The hydrostatic driveline 12000 includes a power source 12002 in driving engagement with a hydrostatic pump 12004 and a direct drive link 12050. The hydrostatic pump 12004 is in fluid communication with a hydrostatic motor 12008. The hydrostatic motor 12008 is in driving engagement with a transmission portion 12052, which is in driving engagement with a vehicle output 12012. The direct drive link 12050 is in driving engagement with the transmission portion 12052, which is in driving engagement with the vehicle output 12012. The hydrostatic driveline 12000 may be operated in a hydrostatic mode or the direct drive mode.

Figure 13:
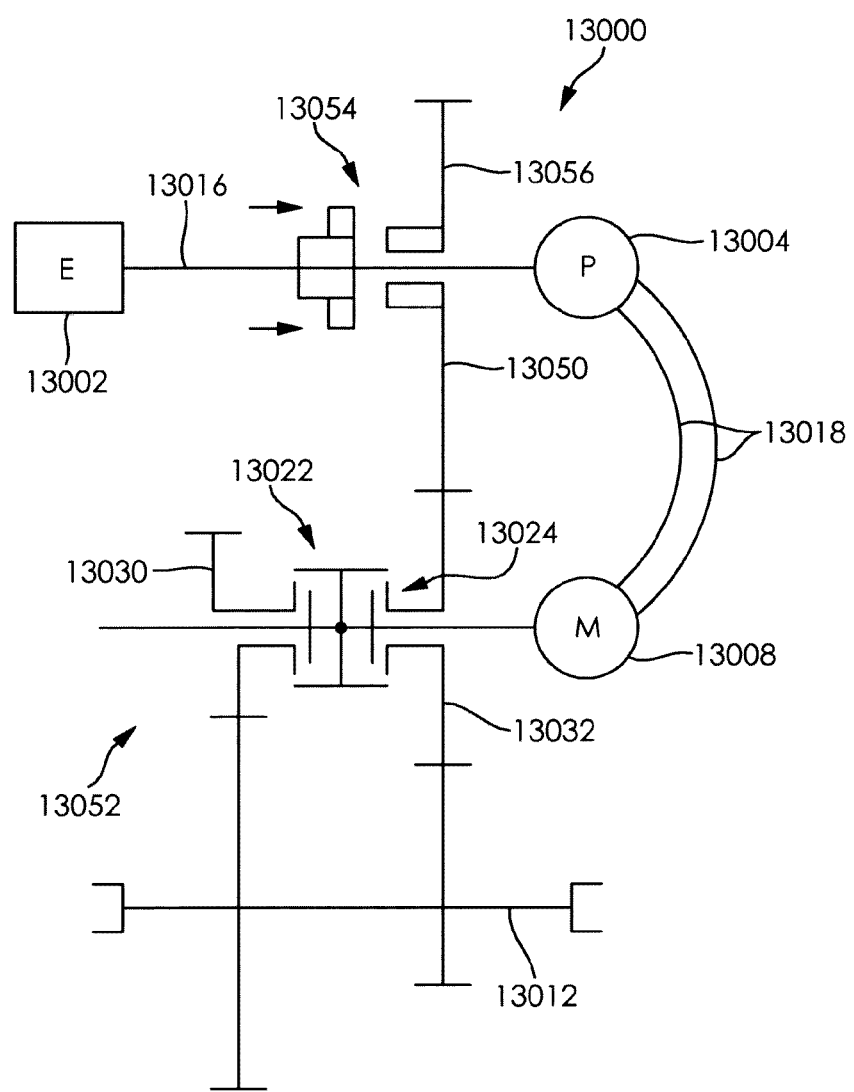
FIG. 13 is a schematic illustration of a variation of the hydrostatic driveline shown in FIG. 11.

FIG. 13 illustrates a hydrostatic driveline 13000. The hydrostatic driveline 13000 is a variation of the hydrostatic driveline 11000, and has similar features thereto. It is also understood that the hydrostatic driveline 13000 may not illustrate all of the features of the hydrostatic driveline 11000. The hydrostatic driveline 13000, however, is a specific embodiment of a hydrostatic driveline that provides a greater level of detail regarding component orientation and component configuration than the hydrostatic driveline 11000. The variation of the invention shown in FIG. 13 includes similar components to the hydrostatic driveline 11000 illustrated in FIG. 11. Similar features of the variation shown in FIG. 13 are numbered similarly in series. Different and additional features of the variation shown in FIG. 13 can be appreciated by one skilled in the art in view of FIG. 13 and the hydrostatic driveline 11000 illustrated in FIG. 11. Further, it is understood that a reverse drive option may be added to a direct drive mode of the hydrostatic driveline 13000 through the addition of further components to the hydrostatic driveline 13000.

FIG. 13 illustrates a hydrostatic driveline 13000. The hydrostatic driveline 13000 includes a power source 13002 in driving engagement with a hydrostatic pump 13004 and a direct drive link 13050. The hydrostatic pump 13004 is in fluid communication with a hydrostatic motor 13008. The hydrostatic motor 13008 is in driving engagement with a transmission portion 13052, which is in driving engagement with a vehicle output 13012. The direct drive link 13050 is in driving engagement with the transmission portion 13052, which is in driving engagement with the vehicle output 13012. The hydrostatic driveline 13000 may be operated in a hydrostatic mode or the direct drive mode.

Figure 14:
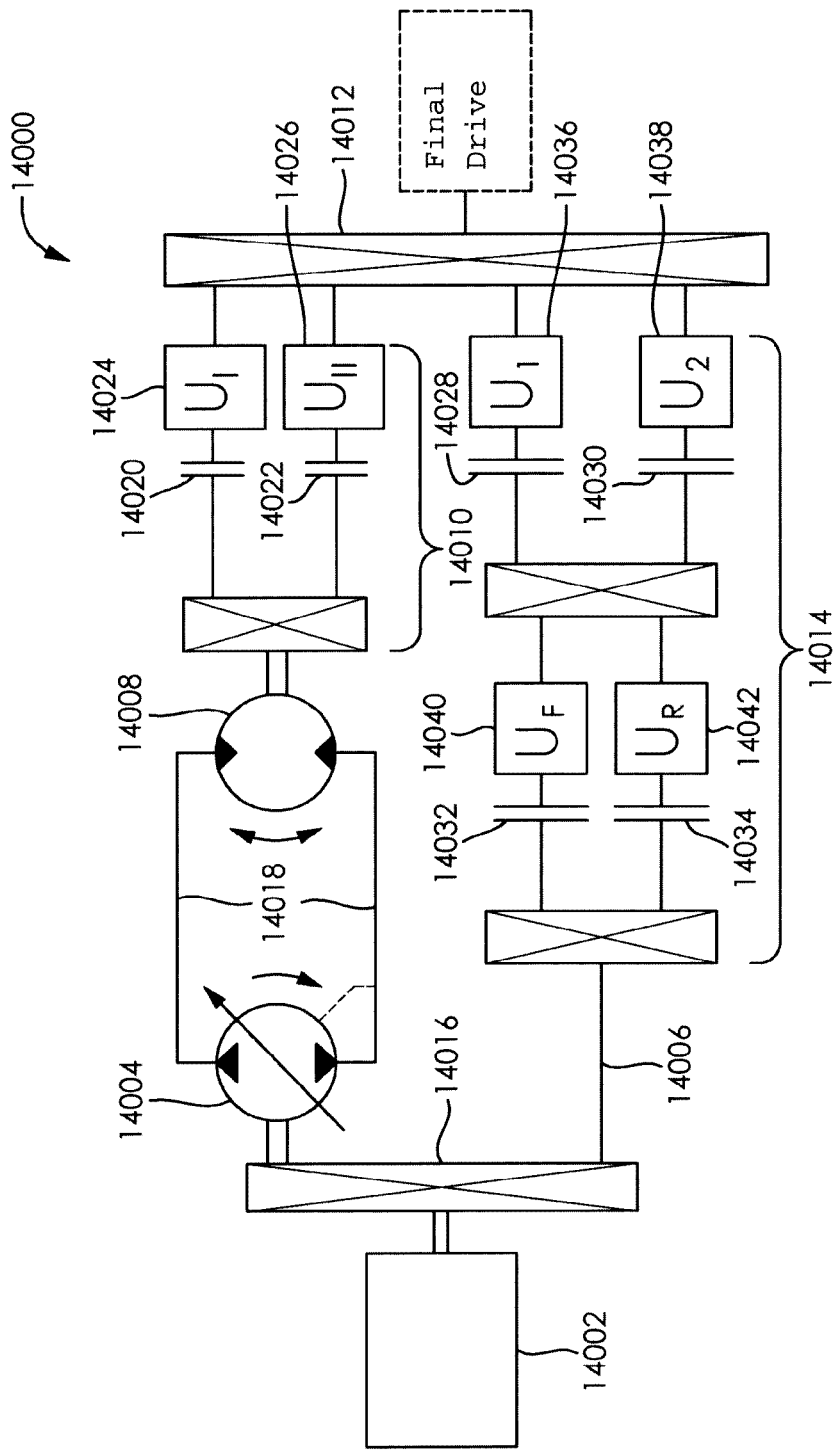
FIG. 14 is a schematic illustration of a hydrostatic driveline according to another embodiment of the present invention.

FIG. 14 illustrates a hydrostatic driveline 14000 according to another embodiment of the invention. The hydrostatic driveline 14000 includes a power source 14002 in driving engagement with a hydrostatic pump 14004 and a direct drive link 14006. The hydrostatic pump 14004 is in fluid communication with a hydrostatic motor 14008. The hydrostatic motor 14008 is in driving engagement with a first transmission portion 14010, which is in driving engagement with a vehicle output 14012. The direct drive link 14006 is in driving engagement with a second transmission portion 14014, which is in driving engagement with the vehicle output 14012. The hydrostatic driveline 14000 may be operated in a hydrostatic mode or a direct drive mode.

The power source 14002 applies power to an input 14016 of the hydrostatic driveline 14000. The power source 14002 is, for example, an internal combustion engine; however, it is understood that the power source 14002 may include an electric motor or another source of rotational output. It is understood that the power source 14002 may be a hybrid power source including both an internal combustion engine and an electric motor. Further, it is understood that the power source 14002 may include an output ratio adjusting device as known in the art. Further, it is understood that the power source 14002 may include an engagement device (not shown) as known in the art, for one of reducing and interrupting a rotational force transferred to the hydrostatic driveline 14000.

The input 14016 is in driving engagement with the power source 14002, the hydrostatic pump 14004, and the direct drive link 14006. The input 14016 may be a gear, a plurality of gears, a shaft, or another type of mechanical connection.

The hydrostatic pump 14004 is a hydraulic axial piston pump having a movable swashplate (not shown) which varies a displacement thereof. However, it is understood the hydrostatic pump 14004 may be any other type of variable displacement pump. As mentioned hereinabove, the hydrostatic pump 14004 is drivingly engaged with the power source 14002 through the input 14016. The hydrostatic pump 14004 is in fluid communication with the hydrostatic motor 14008 through at least two fluid conduits 14018. As the hydrostatic pump 14004 is drivingly engaged with the power source 14002, a drive portion of the hydrostatic pump 14004 always rotates in the same direction as the power source 14002. A direction of flow through the hydrostatic pump 14004 is changed by adjusting a swashplate angle of the hydrostatic pump 14004. By adjusting the swashplate angle of the hydrostatic pump 14004, a forward and a reverse direction is provided when the hydrostatic driveline 14000 is operated in the hydrostatic mode. The hydrostatic motor 14008 is a fixed displacement hydraulic motor.

However, it is understood the hydrostatic motor 14008 may be another type of hydraulic motor. The hydrostatic motor 14008 is drivingly engaged with the first transmission portion 14010. The hydrostatic motor 14008 is in fluid communication with the hydrostatic pump 14004 through the at least two fluid conduits 14018.

The first transmission portion 14010 is a gearbox drivingly engaged with the hydrostatic motor 14008 and the vehicle output 14012. The first transmission portion 14010 includes a first engagement device 14020, a second engagement device 14022, a first drive ratio 14024, and a second drive ratio 14026. By engaging one of the engagement devices 14020, 14022, one of the drive ratios 14024, 14026 is selected. The engagement devices 14020, 14022 are clutches which may be variably engaged; however, it is understood that other types of engagement devices may be used. As mentioned hereinabove, by adjusting the swashplate angle of the hydrostatic pump 14004, the first transmission portion 14010, and thus the vehicle output 14012, may be operated in a forward and a reverse direction.

The direct drive link 14006 is a mechanical connection which facilitates driving engagement between the input 14016 and the second transmission portion 14014.

The second transmission portion 14014 is a gearbox drivingly engaged with the direct drive link 14006 and the vehicle output 14012. The second transmission portion 14014 includes a third engagement device 14028, a fourth engagement device 14030, a first directional engagement device 14032, a second directional engagement device 14034, a third drive ratio 14036, a fourth drive ratio 14038, a first directional drive ratio 14040, and a second directional drive ratio 14042. By engaging one of the engagement devices 14028, 14030, and one of the directional engagement devices 14032, 14034, one of the drive ratios 14036, 14038 and one of the directional drive ratios 14040, 14042 is selected. The engagement devices 14028, 14030, 14032, 14034 are clutches which may be variably engaged; however, it is understood that other types of engagement devices may be used. The drive ratios 14036, 14038 of the second transmission portion 14014 are configured as two drive speeds. The directional engagement devices 14032, 14034 and the directional drive ratios 14040, 14042 are configured to provide a forward and a reverse selection for either of the drive ratios 14036, 14038. It is understood, however, that the second transmission portion 2014 may have other drive speed and directional arrangements.

In use, the hydrostatic driveline 14000 may be operated in the hydrostatic mode or the direct drive mode. In either of the drive modes, only one of the engagement devices 14020, 14022, 14028, 14030 may be fully engaged at any given instant. In the hydrostatic mode, the hydrostatic driveline 14000 is operated at lower speeds using one of the first drive ratio 14024 and the second drive ratio 14026. As mentioned hereinabove, by adjusting the swashplate angle of the hydrostatic pump 14004, the forward and the reverse direction is provided to each of the drive ratios 14024, 14026. In the direct drive mode, the hydrostatic driveline 14000 is operated at higher speeds using one of the third drive ratio 14036 and the fourth drive ratio 14038. In the direct drive mode, a forward and a reverse selection is performed by engaging one of the first directional engagement device 14032 and the second directional engagement device 14034.

Figure 15:
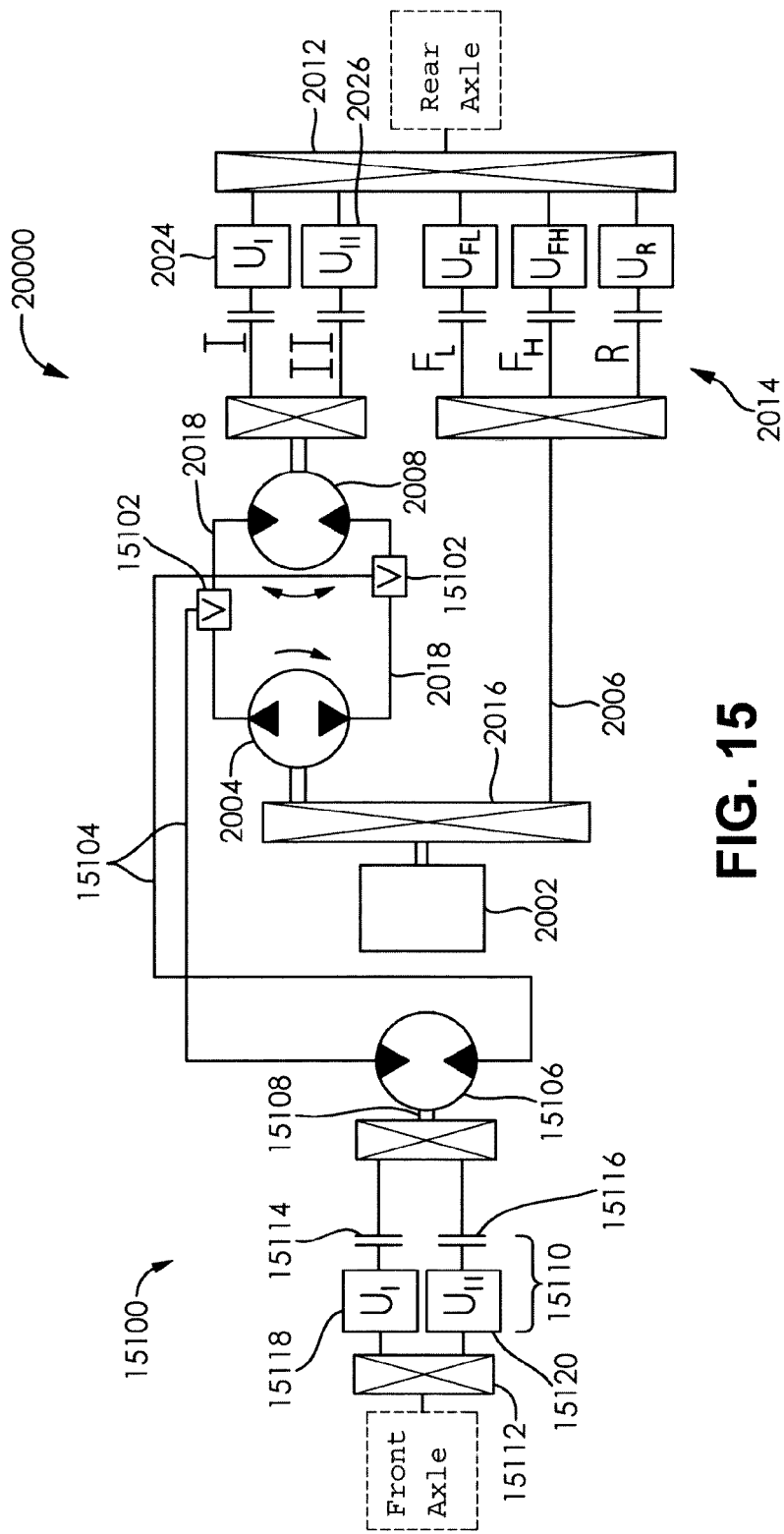
FIG. 15 is a schematic illustration of a hydrostatic driveline according to another embodiment of the present invention, the hydrostatic driveline including the hydrostatic driveline shown in FIG. 14.

FIG. 15 illustrates a hydrostatic driveline 15000 according to another embodiment of the invention. The hydrostatic driveline 15000 includes the hydrostatic driveline 2000 and a front axle driveline 15100; however, it is understood that the hydrostatic driveline 15000 may be configured with any of the hydrostatic drivelines described hereinabove, The hydrostatic driveline 2000 is configured as a rear axle driveline. The fluid conduits 2018 of the hydrostatic driveline 2000 are in fluid communication with the front axle driveline 15100 using at least two valves 15102 and fluid conduits 15104.

The front axle driveline 15100 includes a hydrostatic motor 15106, an input 15108, and a front axle transmission 15110. The front axle driveline 15100 is in driving engagement with a front axle output 15112. The hydrostatic pump 2004 is in fluid communication with the hydrostatic motor 15106 through the at least two valves 15102 and fluid conduits 15104. The hydrostatic motor 15106 is in driving engagement with the front axle transmission 15110, which is in driving engagement with the front axle output 15112. The front axle driveline 15100 is operated in a hydrostatic mode when a vehicle (not shown) the hydrostatic driveline 15000 is incorporated in is placed in a dual axle driving mode. The dual axle driving mode may be a four wheel drive mode.

The input 15108 is in driving engagement with the hydrostatic motor 15106 and the front axle transmission 15110. The input 15108 may be a gear, a plurality of gears, a shaft, or another type of mechanical connection.

The front axle transmission 15110 is a gearbox drivingly engaged with the input 15108 and the front axle output 15112. The front axle transmission portion 15110 includes a first front engagement device 15114, a second front engagement device 15116, a first drive ratio 15118, and a second drive ratio 15120. By engaging one of the engagement devices 15114, 15116, one of the drive ratios 15118, 15120 is selected. The engagement devices 15114, 15116 are clutches which may be variably engaged; however, it is understood that other types of engagement devices may be used. The drive ratios 15118, 15120 of the front axle transmission 15110 are configured as two drive speeds, and the drive ratios 15118, 15120 correspond to the drive ratios 2024, 2026 of the hydrostatic driveline 2000. It is understood, however, that the front axle transmission 15110 may have other drive speed and directional arrangements.

In use, the hydrostatic driveline 15000 may be operated in the hydrostatic mode or the direct drive mode. In the hydrostatic mode, the front axle transmission 15110 may be engaged via the valves 15102 to increase a tractive effort of the vehicle the hydrostatic driveline 15000 is incorporated in. In the direct drive mode, the front axle transmission 15110 is disengaged through closing the valves 15102, allowing the hydrostatic driveline 2000 to drive the vehicle through the direct drive link 2006 and the transmission portion 2014.

The hydrostatic driveline 2000, 3000, 4000, 5000, 6000, 7000, 8000, 9000, 10000, 11000, 12000, 13000, 14000, 15000 offers many advantages over simple hydrostatic transmissions and hydrodynamic transmissions. The hydrostatic driveline 2000, 3000, 4000, 5000, 6000, 7000, 8000, 9000, 10000, 11000, 12000, 13000, 14000, 15000 offers improved performance in the form of high tractive effort for launching a vehicle incorporating the driveline 2000, 3000, 4000, 5000, 6000, 7000, 8000, 9000, 10000, 11000, 12000, 13000, 14000, 15000 due to the hydrostatic portion. Further, a maximum traction force at low speeds remains regardless of an amount of power used auxiliary devices. The hydrostatic driveline 2000, 3000, 4000, 5000, 6000, 7000, 8000, 9000, 10000, 11000, 12000, 13000, 14000, 15000 provides continuously variable capabilities at low speeds, provides high maneuverability, precise speed control, and speed variability (for example, a torque-speed conversion range) to the vehicle. The hydrostatic driveline 2000, 3000, 4000, 5000, 6000, 7000, 8000, 9000, 10000, 11000, 12000, 13000, 14000, 15000 also simplifies reversing a direction of the vehicle by reversing a flow of the hydrostatic pump 2004, 3004, 4004, 5004, 6004, 7004, 8004, 9004, 10004, 11004, 12004, 13004, 14004. The hydrostatic driveline 2000, 3000, 4000, 5000, 6000, 7000, 8000, 9000, 10000, 11000, 12000, 13000, 14000, 15000 offers robustness and high efficiency at high speeds thanks to the direct drive mode. Lastly, the hydrostatic driveline 2000, 3000, 4000, 5000, 6000, 7000, 8000, 9000, 10000, 11000, 12000, 13000, 14000, 15000 offers reduced fuel consumption through the selection of optimal operating modes, which is further supported by improved productivity due to increased performance and maneuverability of the vehicle.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hydrostatic driveline, comprising:
 a power source drivingly engaged with an input member;
 a hydrostatic pump in driving engagement with the input member;
 a first hydrostatic motor in fluid communication with the hydrostatic pump;
 a direct drive link in driving engagement with the input member;
 a transmission portion in driving engagement with a vehicle output and at least one of the first hydrostatic motor and the direct drive link, the transmission portion including at least one engagement device and a drive ratio, wherein the hydrostatic pump, the first hydrostatic motor, and the transmission portion form a first power path for the hydrostatic driveline and the direct drive link forms a second power path for the hydrostatic driveline; and
 a front axle driveline in driving engagement with a front axle output, the front axle driveline comprising a second hydrostatic motor in selective fluid communication with the hydrostatic pump, wherein the second hydrostatic motor is in driving engagement with a front axle transmission portion, and the front axle transmission portion is in driving engagement with the front axle output.

2. The hydrostatic driveline according to claim 1, wherein the transmission portion is a first transmission portion and the hydrostatic driveline further comprises a second transmission portion, the second transmission portion forming a portion of the second power path.

3. The hydrostatic driveline according to claim 2, wherein the first transmission portion includes at least three engagement devices and three drive ratios.

4. The hydrostatic driveline according to claim 2, wherein the first transmission portion and the second transmission portion include at least three engagement devices and three drive ratios.

5. The hydrostatic driveline according to claim 4, wherein at least one engagement device and a drive ratio forms a portion of both the first power path and the second power path.

6. The hydrostatic driveline according to claim 1, wherein the direct drive link includes an engagement device and a drive ratio.

7. The hydrostatic driveline according to claim 1, wherein the drive ratio is both a forward drive gear and a reverse drive gear.

8. The hydrostatic driveline according to claim 2, wherein the second transmission portion includes two engagement devices, two drive ratios, and a directional engagement device.

9. The hydrostatic driveline according to claim 1, wherein the front axle transmission portion includes at least two engagement devices and two drive ratios.

10. The hydrostatic driveline according to claim 1, further comprising a second hydrostatic pump, the second hydrostatic pump in driving engagement with the direct drive link.

11. The hydrostatic driveline according to claim 1, further comprising a power take off, the power take off in driving engagement with the direct drive link.

12. The hydrostatic driveline according to claim 1, wherein the hydrostatic pump is a variable displacement hydrostatic pump and the first and second hydrostatic motors are fixed displacement hydrostatic motors.

13. The hydrostatic driveline according to claim 1, wherein the transmission portion includes at least three engagement devices and three drive ratios, the direct drive link includes an engagement device and a drive ratio, and at least one of the drive ratio is both a forward drive gear and a reverse drive gear.

14. The hydrostatic driveline according to claim 1, wherein the transmission portion comprises a first transmission portion and a second transmission portion,
 the first transmission portion is a first gearbox,
 the first gearbox is drivingly engaged with the first hydrostatic motor,
 the second transmission portion is a second gearbox, and
 the second gearbox is drivingly engaged with the direct drive link.

* * * * *